(12) United States Patent
Stewart

(10) Patent No.: US 8,151,844 B2
(45) Date of Patent: *Apr. 10, 2012

(54) TOOL AND METHOD FOR TIRE TRACTION DEVICE INSTALLATION

(76) Inventor: Dennis I. Stewart, Boise, ID (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/481,123

(22) Filed: Jun. 9, 2009

(65) Prior Publication Data

US 2009/0294004 A1    Dec. 3, 2009

Related U.S. Application Data

(63) Continuation-in-part of application No. 11/708,787, filed on Feb. 20, 2007, now Pat. No. 7,543,618.

(51) Int. Cl.
*B60C 11/00* (2006.01)
*B60C 27/06* (2006.01)

(52) U.S. Cl. ..................................... 152/213 R; 81/15.8

(58) Field of Classification Search ............... 152/213 R, 152/216, 213 A, 219–220, 231, 214–215; 238/14; 81/15.8

See application file for complete search history.

(56) References Cited

U.S. PATENT DOCUMENTS

| | | | |
|---|---|---|---|
| 3,630,440 A | 12/1971 | Sams | |
| 4,031,939 A | 6/1977 | De Martini | |
| 4,103,870 A | 8/1978 | Murakami | |
| 4,223,835 A | 9/1980 | Witt et al. | |
| 4,411,176 A | 10/1983 | Mason | |
| 4,703,675 A | 11/1987 | Dalaba | |
| 5,079,976 A | 1/1992 | Priest | |
| 6,148,887 A | 11/2000 | Ahne | |
| 6,681,657 B2 | 1/2004 | Lyne, Jr. | |
| 7,007,572 B2 | 3/2006 | Woodworth et al. | |
| 7,543,618 B2 * | 6/2009 | Stewart | 152/213 R |
| 2006/0053976 A1 | 3/2006 | Fleming | |

* cited by examiner

*Primary Examiner* — Jason Bellinger
(74) *Attorney, Agent, or Firm* — Pedersen and Company, PLLC; Ken J. Pedersen; Barbara S. Pedersen

(57) ABSTRACT

A tire chain installation tool comprises an elongated member that is connectable to a traction chain or other traction device and that acts as an extension and guide for leading or pulling the traction chain onto a tire. The tool receives one end of the tire traction chain, and an elongated belt of the tool is placed around the tread surface of a vehicle tire. Upon rotation of the tire due to movement of the vehicle, friction between the tire and belt (and capture of the belt between the tire and the ground/road) cause the belt and hence the tire traction chain, to be drawn around the circumference of the vehicle tire. Thus, the traction chain is placed in good position to be fastened without the struggle and discomfort frequently associated with installing chains on a vehicle. The preferred belt is easier to lift and manipulate than the traction chain and does not need to be positioned or manipulated in the space behind the tire (away from the user) or in the space between dual tires.

24 Claims, 9 Drawing Sheets

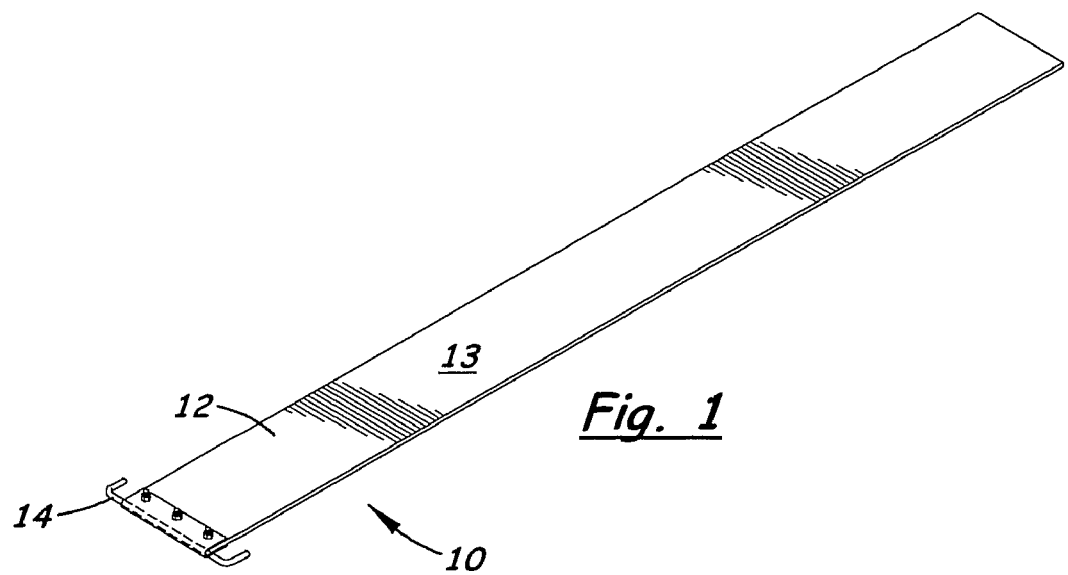
Fig. 1
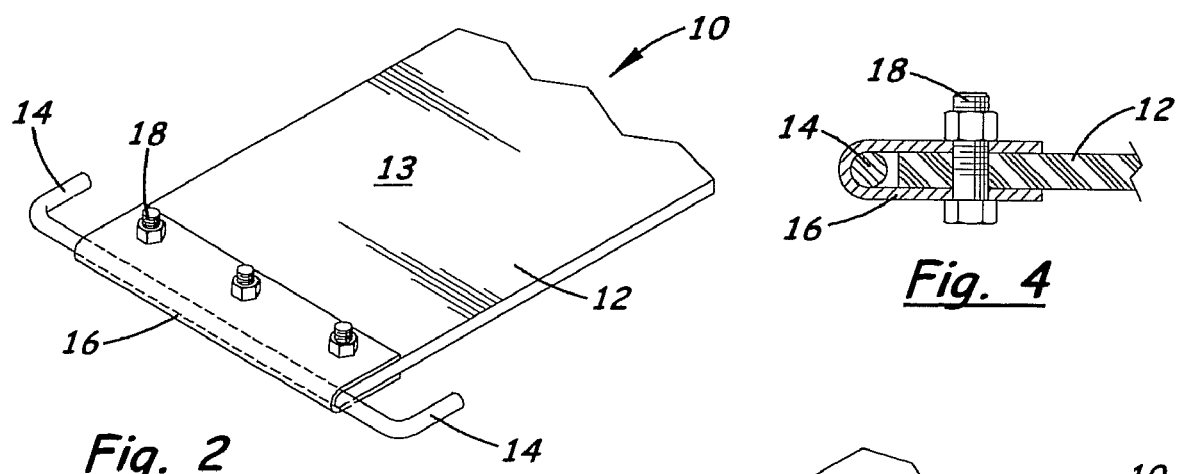
Fig. 2
Fig. 4
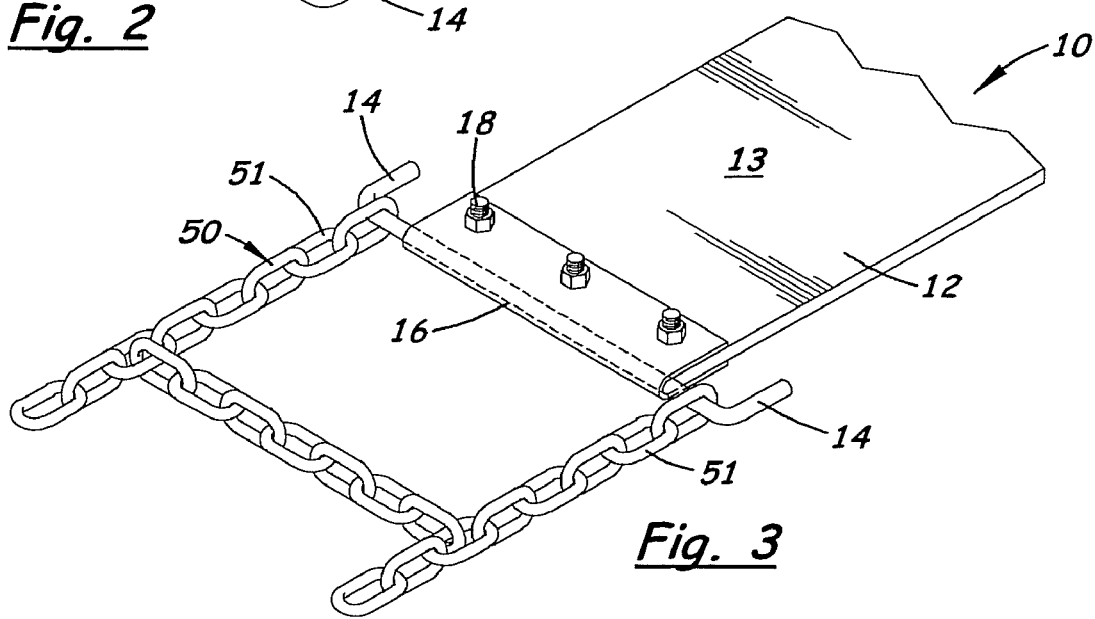
Fig. 3

TOOL AND METHOD FOR TIRE TRACTION DEVICE INSTALLATION

This application is a continuation-in-part of and claims priority of prior U.S. application Ser. No. 11/708,787, entitled "Tool and Method for Tire Traction Device Installation, filed on Feb. 20, 2007, and issuing on Jun. 9, 2009, as U.S. Pat. No. 7,543,618.

BACKGROUND OF THE INVENTION

1. Field of the Invention

The present invention relates generally to systems used to aid in the installation of traction devices upon vehicle tires. More specifically, the preferred embodiment is a self-contained tool that may be employed in the installation of traction chains upon a vehicle tire of any size and shape and that utilizes the rotation of the vehicle tire provided by vehicle power to draw the traction chain about the circumference of the vehicle tire. The use of the tool and method will be recognized as extremely practical by those persons required to install tire chains upon vehicle tires, especially large truck tires, where the traction chains are quite heavy and difficult to install.

2. Related Art

The use of tire chains, encircling and fastened upon vehicle tires for increased traction in snow, ice, or mud, is well known. Many people have addressed the difficulties of installing traction chains on tires. The difficulties are made worse by the need to place the chain around the tire, typically in cramped quarters and frequently in foul, cold weather.

Various devices that attempt to help in this process are disclosed in the patent literature, for example: U.S. Pat. No. 4,031,939, De Martini; U.S. Pat. No. 4,103,870, Murakami; U.S. Pat. No. 4,223,835, Witt, et. al.; U.S. Pat. No. 4,411,176, Mason; U.S. Pat. No. 4,703,675, Dalaba; U.S. Pat. No. 5,079,976, Priest; U.S. Pat. No. 6,148,887, Ahne; and U.S. Patent Application Publication #US2006/0053976 A1, Fleming.

SUMMARY OF THE INVENTION

The present invention comprises a device and methods that aid the installation of tire traction devices, such as chains, upon vehicle tires. The device and methods are designed to be used safely and easily by an individual, typically without assistance, and greatly increase the margin of safety for the user compared to conventional means of installing tire chains.

The device comprises an extension, such as a belt or other elongated member, that may be attached to a traction device, such as a tire chain(s), and that is used as a leader to guide and pull the traction device around the tire. The extension is manually laid around a portion of the circumference of the tire, and the frictional adherence of the extension to the tire surface tends to keep the extension in place on the tire as the driver moves the vehicle. Said movement rolls the tire along the ground/road and the extension moves with the tire, in effect, drawing/pulling the rest of the extension and then the traction device onto the circumference of the tire to an extent that the traction device encircles most of the circumference of the tire and the ends of the traction device are easily reachable. At this point, the extension is lying on the ground/road behind or in front of the tire, depending upon whether the chains have been installed by moving the vehicle forward or rearward, the extension may be easily removed from the traction chains for reuse, and the ends of the traction device may be fastened to retain it on the tire.

The extension may be made of various materials, shapes, and sizes, and may be a belt, flap, track, or other elongated structure that is preferably more easily lifted and manipulated than the traction chain/device itself. A preferred extension is a belt that is generally flat and continuous, and of such a weight, to be easily installed around said portion of the circumference, and yet has a coefficient of friction with the tire tread that adapts the belt to be pulled with the tire as it rotates. Further, the belt or other extension is preferably wide enough and firm enough to lay generally straight along the circumference of the tire, resist transverse sliding off the tire, resist longitudinal sliding off the tire, and resist twisting during movement of the tire. The preferred extension does not comprise structure located on the far side of the tire (side of tire away from the installer), and so does not require placement or manipulation of such structure in this difficult-to-reach and typically-cramped location.

The preferred embodiments comprise a connector that is attached to one end of the extension and that comprises means to attach to the traction device so that the extension and traction device are parallel and, in some embodiments, their central longitudinal axes are generally co-linear. The connection of the traction device to the extension is preferably such that at least the leading end of the traction device is spread apart in proper shape and width as it is pulled onto the tire. This is especially desirable in the case of tire chains, wherein the chain-link runners (side edge members) may slide/fall together because the cross-members are also chain link.

Embodiments of the invention, for example, may include a single extension that pulls a single traction device onto a single tire, or multiple extensions that are connected to pull multiple traction devices, or a single extension that connects to an extra-wide traction device.

BRIEF DESCRIPTION OF THE DRAWINGS

FIG. 1 is a perspective view of one embodiment of the invented tire chain installation tool.

FIG. 2 is a perspective detail view of the connector end of the tool of FIG. 1.

FIG. 3 is a perspective detail view of the connector end of the tool of FIG. 1 connected to one embodiment of a traction chain.

FIG. 4 is a longitudinal cross-sectional view of the connector end of the tool of FIG. 1.

In FIGS. 8-11, an arrow illustrates the direction of tire rotation, wherein it may be assumed that the vehicle is moving forward toward the left of the paper sheet. Specifically, FIGS. 8-12 portray the following:

FIG. 8 illustrates the installation tool of FIG. 1 connected to a traction chain, wherein the tool has been laid around the outer circumference of the tire by the user and the chain trails away from the tire on the ground/road.

FIG. 9 illustrates the position of the tool and traction chain after the vehicle has been moved a foot or two, wherein the tool continues to lie on the tire tread and has been pulled around with the tire as the wheel rotates, pulling the traction chain up with it.

FIG. 10 illustrates the tire after the vehicle has been moved several more feet, the tool has continued to move with the tire as the wheel rotates, and the traction chain has been pulled across the top of the tire.

FIG. 11 illustrates the tire after the vehicle has been moved several more feet to a point at which the tool is entirely on the ground/road behind the tire, and the traction chain has been pulled substantially all the way around the tire.

FIG. 12 illustrates the tire and installed traction chain, after detachment of the tool from the traction chain and connection of the traction chain ends to fasten the traction chain around the tire for use.

In FIG. 13, therefore, the front of the vehicle is toward the left of the paper sheet.

DESCRIPTION OF THE PREFERRED EMBODIMENTS

Figure 5:
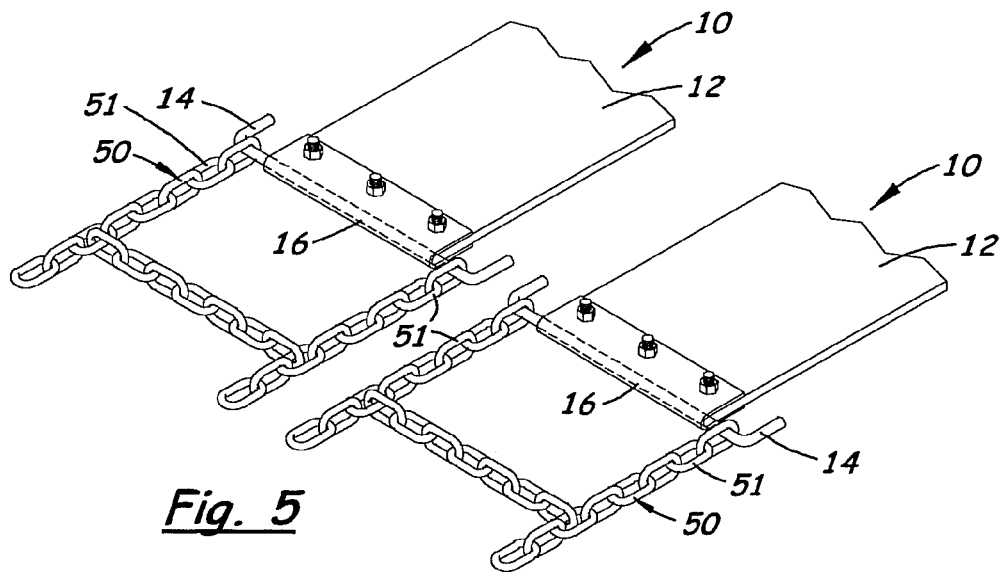
FIG. 5 is a perspective view of another embodiment of the invention, wherein two installation tools are aligned parallel and near to each other, each being connected to a respective traction chain, ready for installation on dual tires such as may be part of a semi-tractor-trailer unit.

Referring to the Figures, there are shown several, but not the only, embodiments of the invented tire chain installation device used to aid in the installation of tire chains upon vehicle tires.

A typical traction chain comprises two spaced runner chains that run the length of the traction chain, and transverse or "cross" chains that connect the runners. The runners extend circumferentially around the tire at the sides of the tire and the cross-chains extend transversely across the tire tread to provide traction. Alternative traction chains for dual tires include three spaced runners and cross-chains extending transversely between the three runners. The invented tool may be used or adapted to be used with these and other traction devices, including traction devices that are made of other materials than chain link. For example, there may be traction devices that use cable rather than chain links, and/or that use spike or stud type protrusions to provide traction. The term "traction device" as used in this description and claims, therefore, is intended to use traditional traction chains of chain links and also any other traction devices that are elongated for being wrapped circumferentially around a tire or tires and that have protrusions, studs, or other very rough or protruding objects for creating traction on the ground/road.

Conventional traction chains of chain link are well-adapted for use with embodiments of the invented installation tool, because the tool may be hooked to end links of the traction chains. However, other styles and constructions of traction devices may be adapted, or the tool itself may be adapted, for connection of the tool to the traction device. For example, various hooks, clamps, clips, and fasteners (preferably quickly-connectable and quickly-disconnectable) may be provided on the installation tool, or on an adapter for the tool, or even on the traction device, to allow connection of one or more of the invented tools to one or more traction devices.

Referring now to FIGS. 1, 2 and 4, it may be observed that the preferred tire chain installation device 10 (also called herein "tool 10") is comprised of belt 12, affixed to one end of which is a connector, which may take the form of hook 14 secured to belt 12 utilizing bracket 16 and fasteners 18. While bracket 16 is shown as bolted to the belt 12, it may instead be riveted, clamped, or otherwise fastened to the belt, or even integral with the belt. Two hooked or curved ends are disposed outwardly from each side of the hook 14, wherein said hooked or curved ends accepting the end links of each of two runner chains on a typical tire chain. After assembly of the aforementioned components, hook 14 is preferably captured inside, and is not free to rotate within, bracket 16, so that the preferred bent or curved end of the hook 14 remain pointing away from the chains 50. Many different connectors may be used, with the ones portrayed in the Figures being easy and economical to manufacture, durable, and reliable.

Note that an important feature of the preferred connectors for connecting the belt to the traction chain is that they have a width, or extend outward to a width, and have a rigidity that, when connected to the traction chain, keeps the traction chain (at least the leading end of the traction chain) expanded to its maximum width, or nearly its maximum width, that is, a "spread-out configuration." This helps keep the traction chain expanded as it is pulled onto the tire so that it wraps around the tire in the proper position and requires little or no adjustment or intervention by the user prior to fastening and use. Note also that this feature may work well with other traction devices, such as cable-based traction devices, wherein the connector will preferably keep the outer cable runners spread apart (at the device's leading end) to the traction device's maximum width.

Referring now to FIG. 3, it will be seen that one embodiment of traction device, a traditional traction chain or "tire chain 50," is attached to the tire chain installation device 10 by slipping the end links of each runner chain over the end portions of hook 14. In the position shown in FIG. 3, the belt 12 extends out from the tire chain 50, parallel to the tire chain 50, with the longitudinal axis of the belt parallel to, and co-linear with, the longitudinal axis of the tire chain 50 (the longitudinal axis of the tire chain 50 being parallel to and centered between its runners, as will be understood by one of skill in the art). This way, the tool 10 and its belt 12 may be thought of as an extension of the tire chain 50, with the difference between the belt 12 and the chain 50 including that the belt 12 of the tool is preferably a continuous member with a flat surface 13 without the apertures, protrusions, chain links, studs, spikes, or other features that are inherent in a traction chain or other traction device. Also, the belt 12 is preferably significantly lighter than the chain 50, so that it is much easier for the user to wrap the belt 12 around part of the tire circumference than it is to wrap the chain 50 around the tire. Also, the belt 12 preferably does not extend behind the tire to the far side of the tire (as one of the chain runners does) and so the user need not manipulate any structure on the far side of the tire (the space at the "inner" side of the tire) to successfully place the chain 50 on the tire. While the user may need to slide the belt 12 onto the outer perimeter (tread surface) of the tire generally in the wheel well, the user will typically not need to reach past the tire to the inner side of the tire. Fastening the chain 50 at the end of the installation process may require some reaching to the far side of the tire, but at a lower location that is easily reached.

While a traction device is designed to greatly increase traction between the "chained-up" tire and the snow, ice, or mud-covered ground/road, the belt 12 is designed to be more easily laid around the tire circumference without placement or manipulation on the far side of the tire. Because it preferably lacks said apertures, protrusions, chain links and other features that increase traction in a traction device, the belt tends not to catch on the tire or its tread while the user is sliding/inserting the belt onto the tire (generally into the position shown in FIG. 8). The belt should have enough rigidity that the user may grasp it in two places and still manipulate the entire belt easily (unlike extremely flexible, sagging, hanging chain links) and yet enough flexibility that, once inserted onto the space immediately above the tire, it can bend easily to conform to, and lay upon, the outer circumference of the tire. The belt should have a surface texture or surface composition, at least on the side that contacts the tire, that grips the tire surface, that is, there should be a coefficient of friction between the belt and the tire that keeps the belt in contact with the tire while the wheel and its tire rotate (roll) in a direction away from the location of the traction chain (laid out on the ground/road as in FIG. 8), preferably with little or no relative motion between the belt and the tire. Also, the belt should be wide enough and rigid enough so that it does not tend to twist, but instead lies flat against the tire tread on the circumference of the tire, and "follows along with" the tire as the wheel/tire rotate. It is desired, and may be accomplished with the invented tool, that the tool and its belt do not fall off of the tire, but rather remain with the axis of the tool parallel to the plane of the tire (said plane of the tire extending through the tire midway between the sides of the tire, parallel to the plane of the paper in FIGS. 8-11), rather than moving transversely off of the tire.

While the belt 12 is described as lacking apertures, protrusions, chain links and other features that increase traction in a traction device, there may be alternative versions of the extension within the scope of the invention that do have apertures, protrusions, or other features that are non-flat and that enhance gripping of the tire tread. See, for example, FIGS. 14 and 15. Still, it is preferred that such an extension be lighter weight than the chain 50 or other traction device, and/or that the extension not have any portion that needs to be place or manipulated on the far side of the tire (away from the user).

Referring now to FIG. 5, it will be observed that, for dual tires, such as those found on large trucks, two tire chain installation devices 10 may be used simultaneously in conjunction with two tire chains 50. Alternatively, only one of said devices 10 may be used, preferably only on the outer tire of the dual tire combination.

Figure 6:
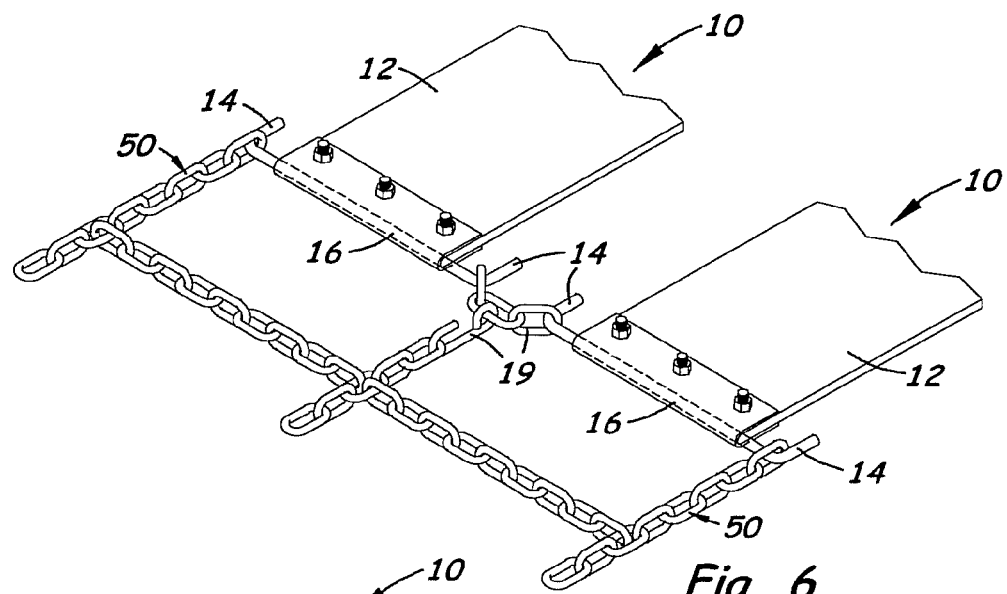
FIG. 6 is a perspective view of two installation tools according to one embodiment of the invention, wherein said two tools are linked together with one embodiment of an adapter, and wherein said triple runner chain is attached at its outer runners to the outer hooks of the tool and at its inner runner to the adapter.

Referring now to FIG. 6, another alternative for a dual tire combination may be that two tire chain installation devices 10 may be used in tandem, being connected at the inner, adjacent bent or curved and portions of hooks 14 using link assembly 19. Such an assembly may be used to install what is known as a "triple runner chain" upon dual tires, wherein the outer runner chains are connected to the outer ends of hooks 14 and the center runner chain is connected to link assembly 19. Link assembly 19 may be of various designs, preferably with structure for linking the devices' connectors (in this example, the inner ends of hooks 14) and with structure for attaching to the central runner. This way, two of the preferred devices 10 may be used to substantially span the width of the triple runner chain.

Figure 7:
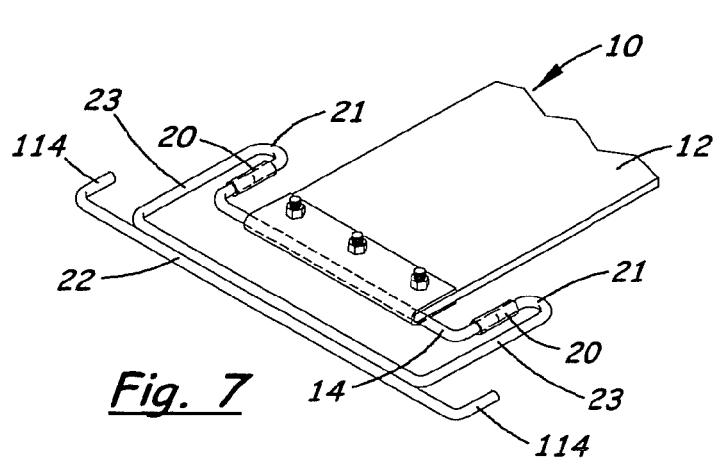
FIG. 7 is a perspective view according to another embodiment of the present invention, wherein another adapter is provided on the installation tool of FIG. 1 for extending out to hold the runner of a chain for a super single tire.
Figure 18:
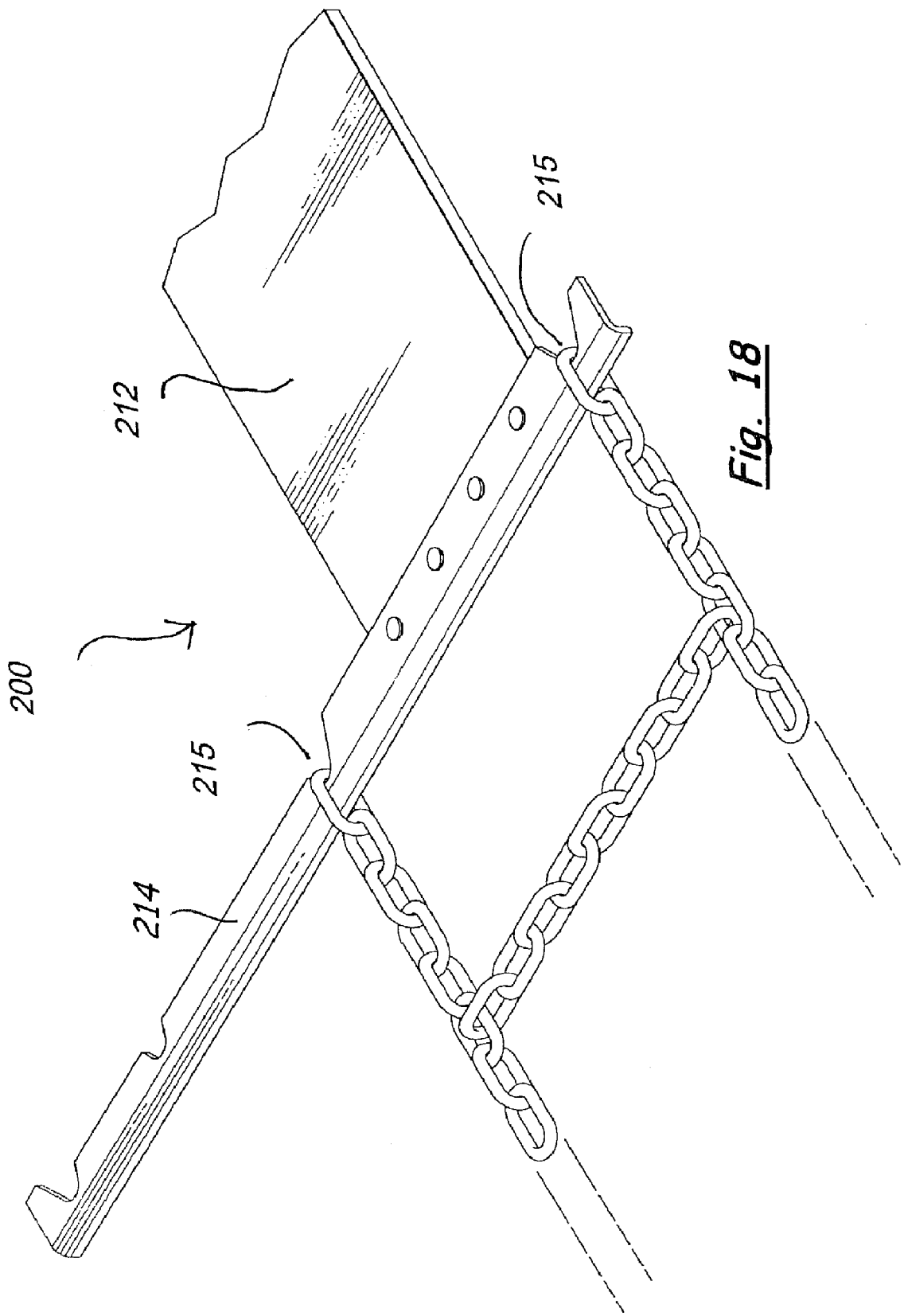
FIG. 18 shows an especially-preferred embodiment connected to a standard single tire chain.
Figure 19:
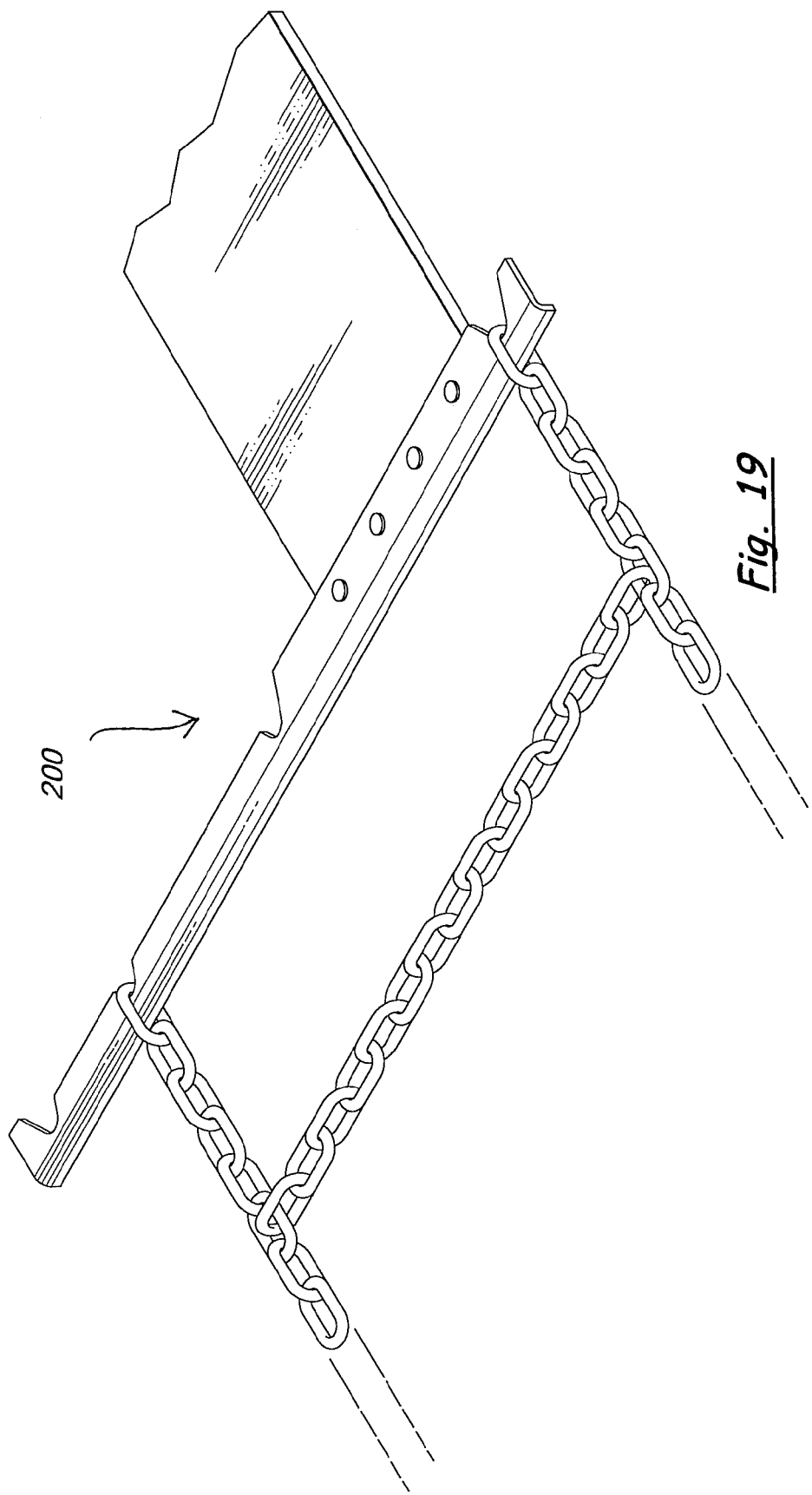
FIG. 19 shows the installation device of FIG. 18 connected to a super wide single (or"super-single") tire chain.
Figure 20:
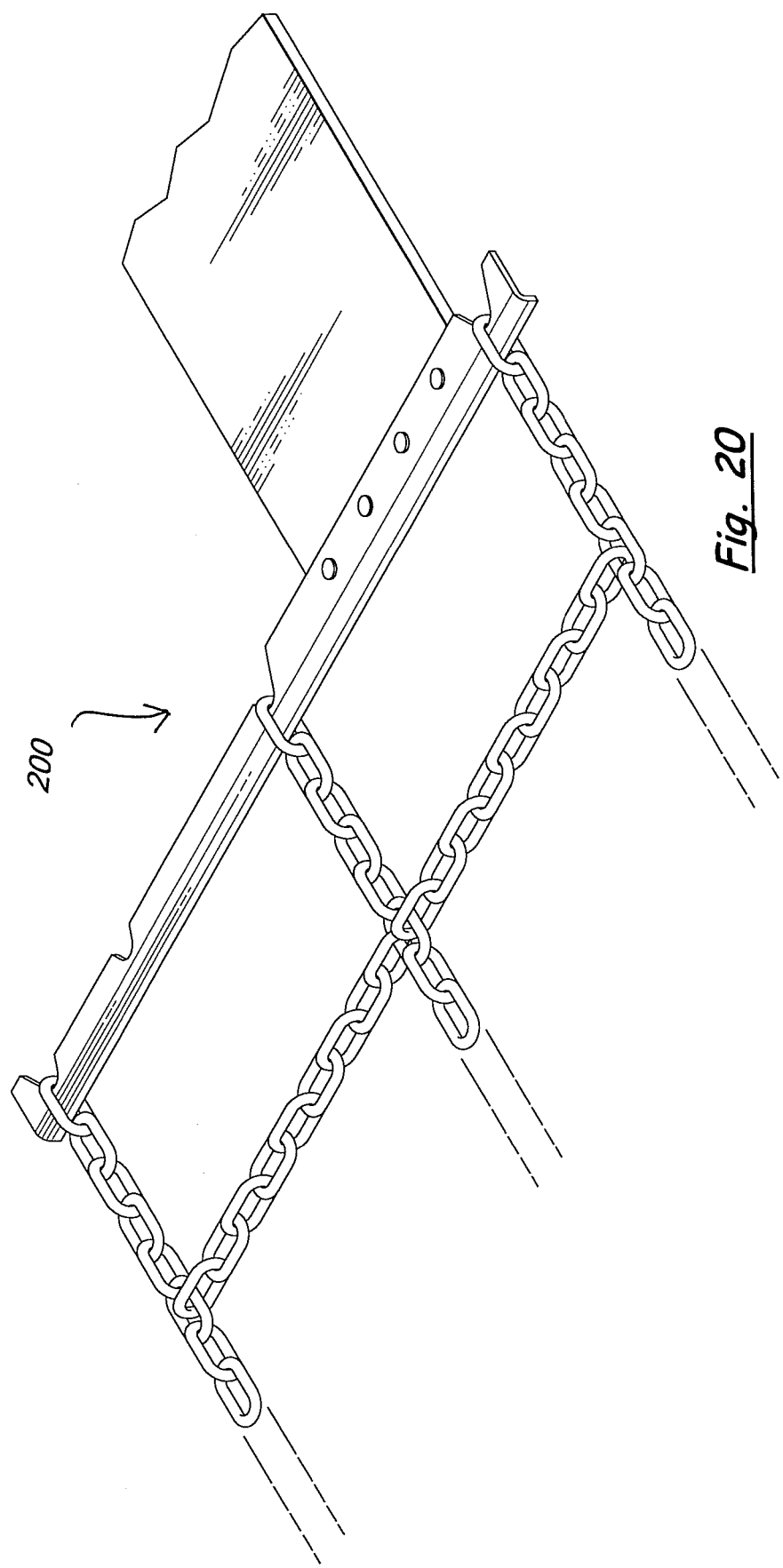
FIG. 20 shows the installation device of FIGS. 18 and 19 connected to a triple-runner tire chain.

Referring now to FIG. 7, it will be observed that for very wide tires, commonly known as super single tires, a wider hook assembly 22 may be temporarily mounted to the connector of the device 10 (here, to hook 14), for example, using sleeves 20. Sleeves 20 each have two open ends that receive an end of the hook 14 and also an end 21 of the longitudinal arm 23 of the assembly 22. The force created in drawing the tire chain 50 upon the vehicle tire tends to keep hook assembly 22 secured in place upon hook 14. Alternatively, an embodiment of the installation tool (10) may be adapted to permanently comprise a different connector that is specially-adapted for super single tires, so that a driver of a vehicle having such tires will keep the specially-adapted tool on board for use with the super single tires. Such special adaptation may be to provide a connector on the belt that extends out transversely farther than the connector shown in FIGS. 1-3, in effect, to provide a connector width similar to the width of the wider hook assembly 22 shown in FIG. 7. In addition to the connector/adapter being made wider for super single tires, the extension or belt itself also may be made wider for super single tires, as this may provide additional stability of the extension belt on the tire during the invented methods; however, the inventor does not believe that increased belt width is necessarily required. FIGS. 18-20, which will be discussed later in more detail, illustrate an embodiment wherein a single, narrow belt has a connector capable of connecting to one or more chains that are substantially wider than the belt.

While the vehicle is not shown in FIGS. 8-12, it will be understood that the tire and wheel shown in FIGS. 8-12 are attached to a vehicle and will be moved to the left in FIGS. 8-11 by driving the vehicle.

Figure 8:
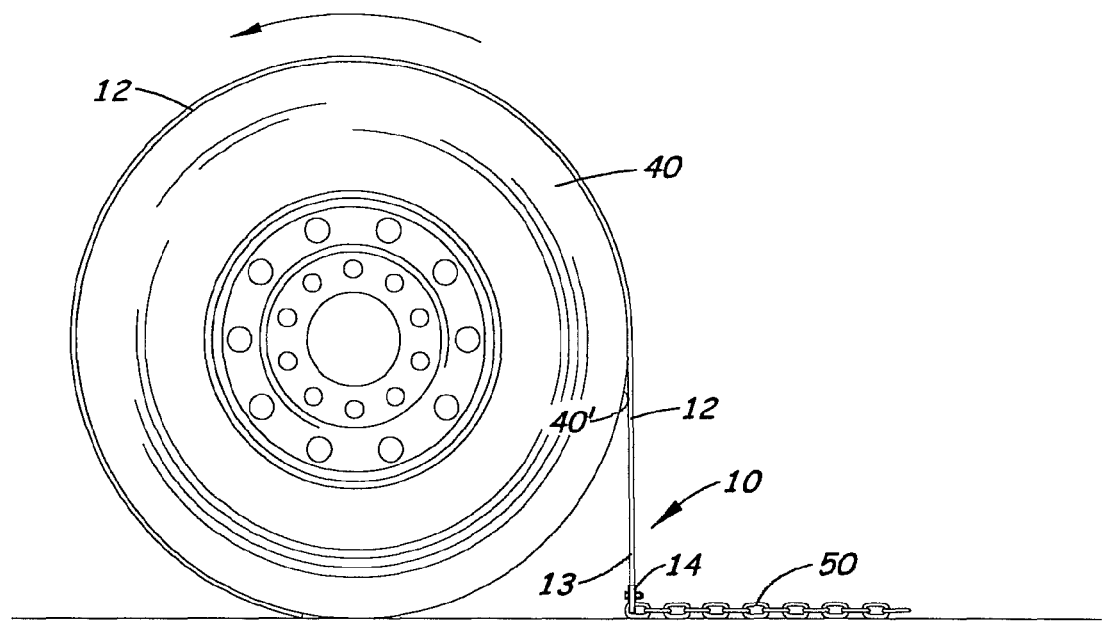
FIGS. 8-12 are side elevation views illustrating one method of using an embodiment of the present invention.

Referring now to FIG. 8, the tire chain installation device 10 has been connected to tire chain 50 and installation on the tire has begun. Belt 12 has been placed approximately three-quarters of the way around the tread surface of vehicle tire 40 by the user, by lifting the belt up and into the space above the tire and below the vehicle chassis/body (not shown except in the example vehicle of FIG. 13). Preferably, during this step, all or a substantial portion of the tire chain 50 remains on the ground parallel to the belt, and the distal end of the belt 12 at or near the ground and preferably "tucked" under the tire at the ground. If the device 10 is shorter than the one shown in FIG. 8, the portion of the tire chain 50 to which the device 10 is connected may be lifted up off the ground to be near or contacting the tire (at 40' or up to 1-2 feet above the ground, for example). Note that, with the preferred device 10 and the preferred methods, the tire chain 50 does not need to be lifted up and maneuvered into the wheel well (or space on the far side of the tire) to be draped over the tire (which is the most difficult part of traditional chain installation); the only required lifting of the tire chain 50 is that which enables the user to move the tire chain from its storage place to the ground, with the connected end of the tire chain either left resting on the ground or lifted along either the front or rear of the tire (but preferably not over the tire).

It is preferred that the belt 12 be laid around at least 180 degrees of the tire circumference, and preferably around about 270-300 degrees of the tire circumference, so that there is good gripping of the belt to the tire. The belt is preferably laid along the top half of the tire, and down to the ground on either the front or rear of the tire (depending upon from which direction the chain is being installed) so that the leading end may be slightly pushed under the tire between the tire and the ground/road. If the belt is not flexible or bendable enough to lie, or to be wedged, underneath the tire, the belt's firmness and slight rigidity may make the leading end of the belt hang down in front of the tire without contacting the tire in that region (or in back of the tire, depending upon from which direction the chain is being installed). Such hanging down in front of (or in back of) the tire may allow the belt, when the vehicle is driven forward (or backward), to hit the ground and either bunch up, slide to the side, or slide in the same direction that the vehicle is moving, rather than staying underneath the tire as the tire rolls forward (or backward) over it. See the preferred steps of FIGS. 9-11.

Figure 9:
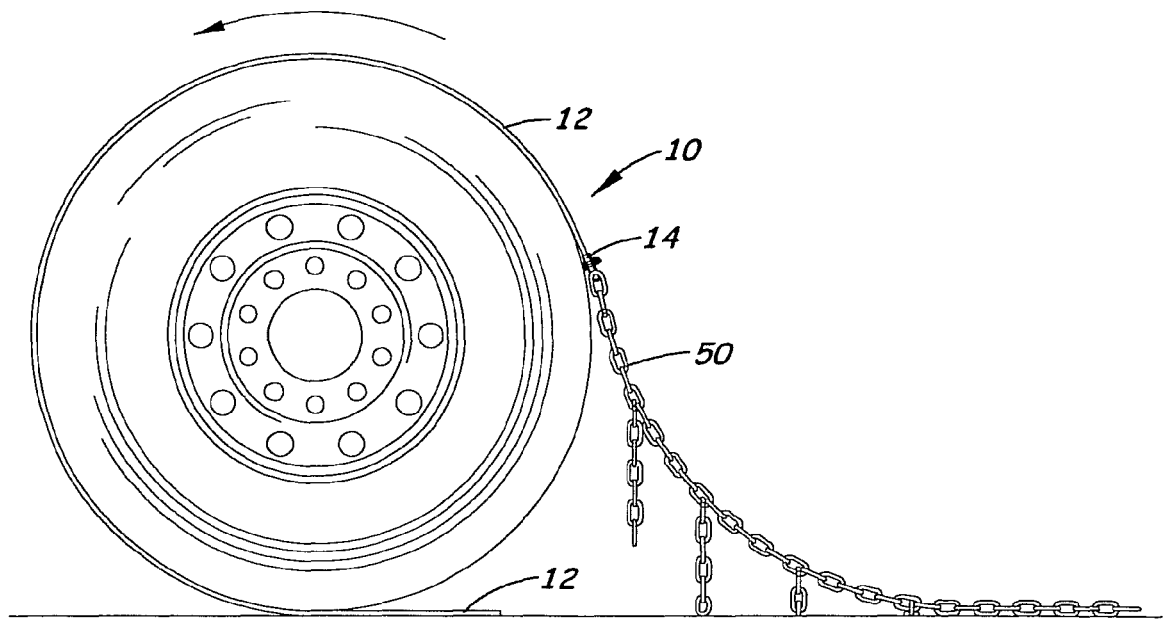

Referring now to FIG. 9, it will be observed that the tire 40 has rotated in a counter-clockwise direction due to movement of the vehicle slightly forward (to the left). The rotation of tire 40 causes belt 12 to rotate with the tire due to friction between the two surfaces (belt and tire tread) in contact with one another and, in FIGS. 9 and 10, due to the belt being captured between the tire and the ground/road. As the belt 12 rotates with the tire, it draws tire chain 50 upon and around the circumference of tire 40.

Figure 10:
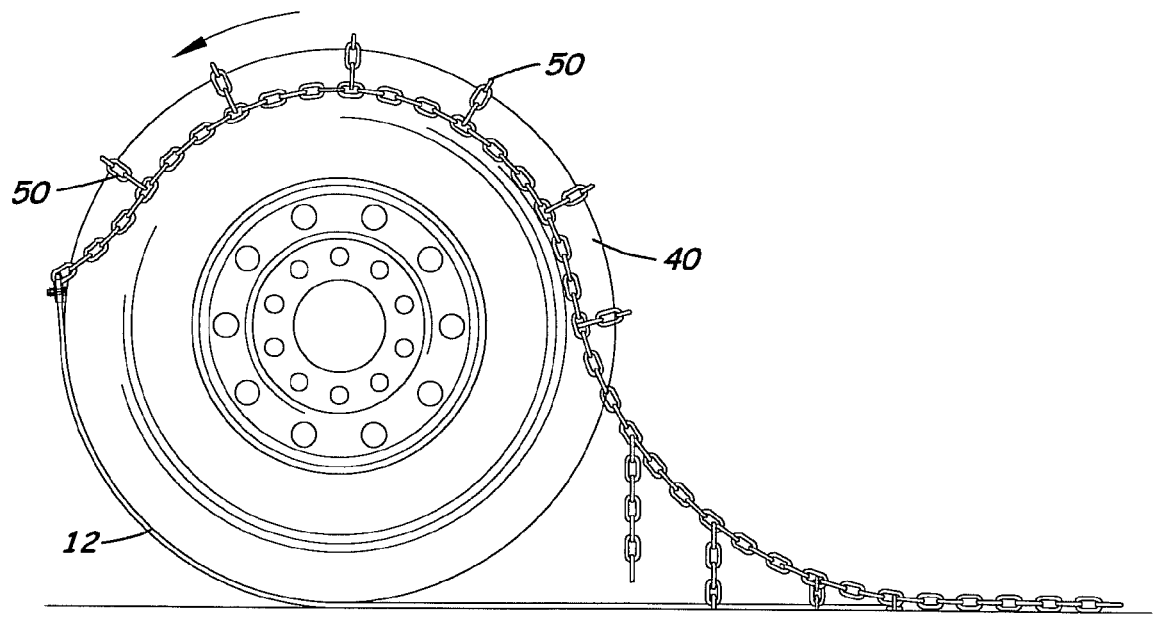

Referring now to FIG. 10, it will be seen that, upon continued rotation of tire 40 by continued driving of the vehicle slightly forward (to the left), belt 12 and tire chain 50 have been drawn around tire 40 to the extent that the tire chain 50 extends around about half of the circumference of the tire, and the leading end of the belt is lying on the ground behind the tire (possibly touching the trailing end of the chain 50 but not connected to it).

Figure 11:
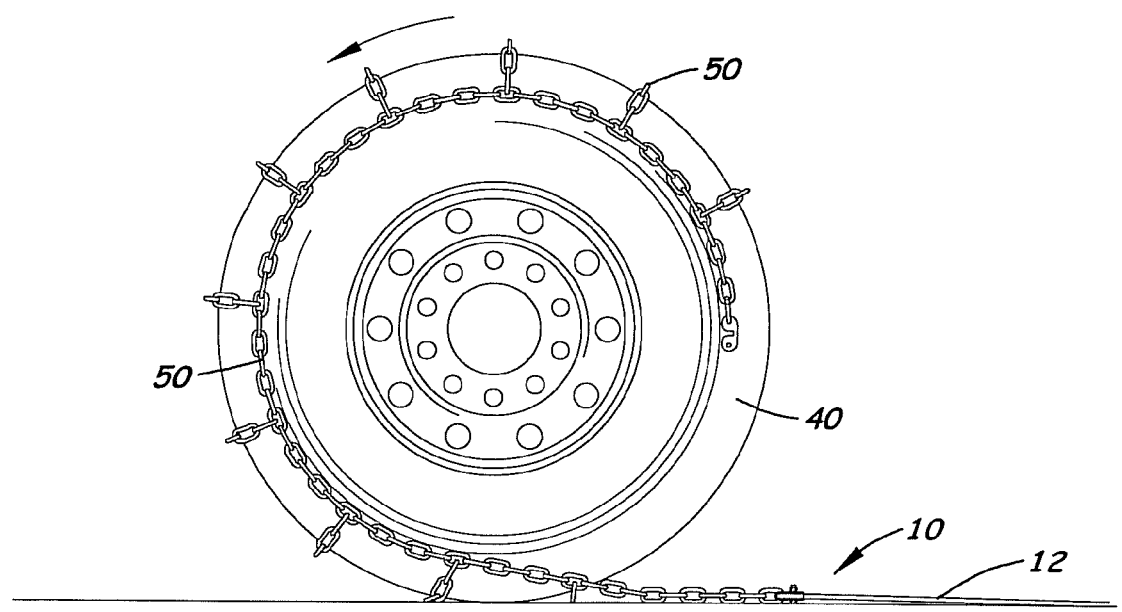
Figure 12:
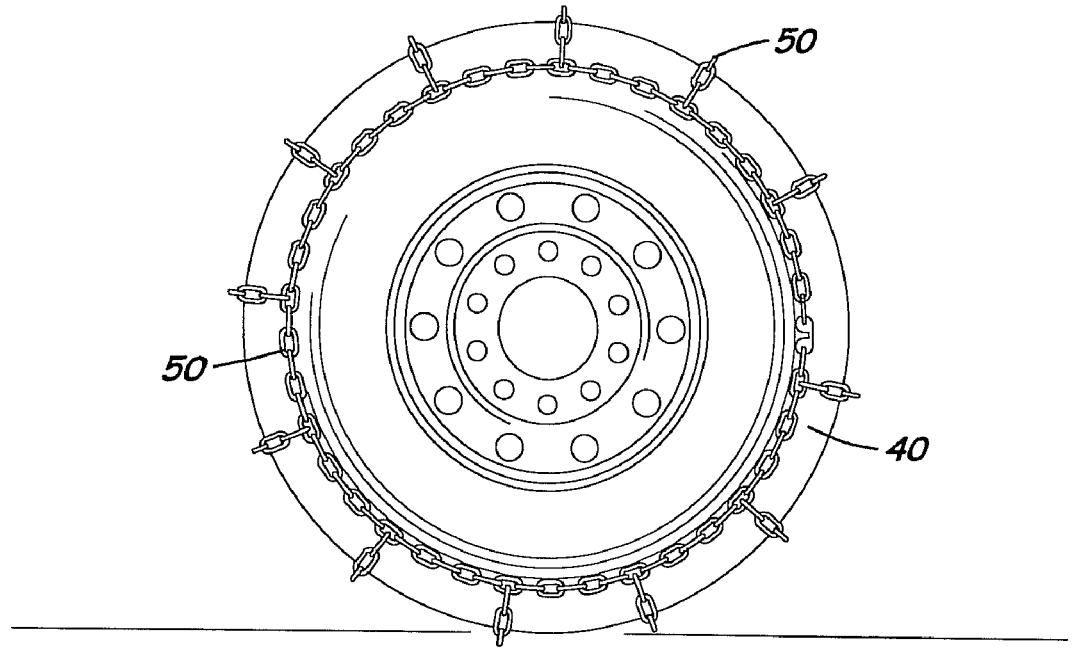

Referring now to FIG. 11, it will be seen that, upon continued rotation of tire 40 by continued driving of the vehicle forward (to the left), that the chain 50 encircles more of the circumference of the tire, preferably approximately 270 degrees. Belt 12 is entirely on the ground behind the tire and the leading end of the tire chain 50 stays with the tool 10 and so is resting on the ground/road with the tool 10. At this point, it is desirable to stop movement of the vehicle, unhook the tire chain 50 from the tool 10, lift the leading end of the tire chain 50 the short distance to the trailing end and fasten them together, resulting in the configuration shown in FIG. 12. The ends of the tire chain 50 may be connected to each other in conventional manner. After detaching tire chain installation device 10 from tire chain 50, the device 10 may be conveniently stowed away until needed again.

If the driver were to continue driving from the position shown in FIG. 11, without disconnecting the tool 10 from the tire chain and fastening the tire chain, the wheel/tire would continue to the left and would unwrap the chain from the tire and leave both the chain 50 and the tool 10 lying on the ground/road. Thus, the driver, or an assistant, will know or quickly learn how far to move the vehicle to wrap the chain around the tire to the desired extent.

In many instances there is enough room behind the tire (onto which the tire chain 50 is to be installed) to allow the tool 10 and tire chain 50 to be laid out on and behind the tire. This way, the driver may drive forward during the installation steps described above. However, assuming there is sufficient room in front of the tire, the tool 10 and methods will work as well when the tool 10 and tire chain 50 are laid out on and in front of the tire; this way, the driver simply backs up the vehicle V during the steps described above rather than moving the vehicle forward. This may be beneficial when installing chains on tires of dual axles, wherein there is not enough room behind the front tires of such dual axles to lay-out the tire chain 50.

Figure 13:
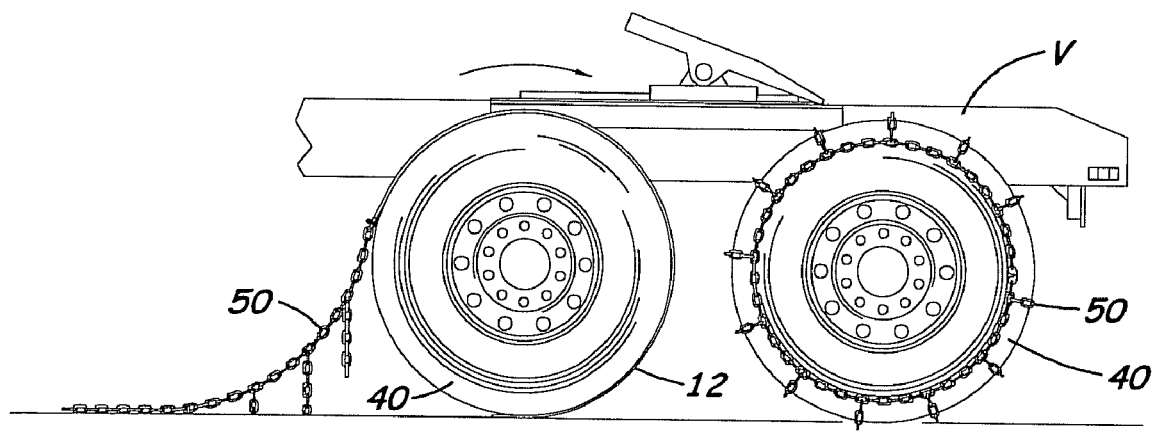
FIG. 13 illustrates a partial view of a tractor/truck comprising a fifth wheel, wherein a traction chain has already been installed on the rear tire of a dual axle arrangement, and a traction chain is being installed on the front tire by use of the tool of FIG. 1. Note that this is an example of a case wherein the traction chain is laid-out in front of the tire, the tool is wrapped rearward around the top and rear of the tire, and then the vehicle is backed-up to draw the tool and traction chain rearward and around the tire.

An example of installation on a dual axle "fifth wheel" system is shown in FIG. 13. The front of the vehicle is toward the left of the figure, and chains 50 have already been installed according to the preferred embodiments on a rear tire 40 of the dual axles. To install chains 50 on the front tire 40 of the dual axles, the tool 10 is wrapped around the tire 40 and preferably "tucked" into the space between the rear surface of the tire and the ground. The chain 50 is laid out in front of the front tire 40 and the driver moves the vehicle V rearward, to the position shown in FIG. 13 (wherein the tire 40 has already rolled onto the leading end of the belt 12), and then further rearward until the chain is substantially wrapped around the tire 40. After the chain 50 is substantially around the tire 40 and the leading and trailing ends of the chain 50 are preferably both located at the front side of the tire, the tool 10 may be removed and the chain ends may be fastened.

The preferred material for belt 12 is a rubbery material, such as conveyor belt material or other synthetic rubber or polymeric material or composites or layered materials. The preferred dimensions are 8 inches wide, 80 inches long, and $5/16$ inch thick, although these dimensions may be varied to suit differently sized tires upon which the device will be applied. It is expected that many, but not necessarily all, embodiments of the belt will fall within the dimension ranges of 6-18 inches wide, 60-120 inches long, and $1/4$-$3/8$ inches thick. Preferably, the belt is slightly shorter than the length of the tire chain, and, hence, slightly shorter than the circumference of the tire upon which the tire chain is being installed, however, alternative belt lengths may be used. For example, the belt is preferably in the range of 50-120 percent of the length of the chain and of the tire circumference, but more likely 60-80 percent of the length of the tire chain and/or the tire circumference, and most preferably about 75 percent of the length of the tire chain and/or the circumference of the tire. The belt width may approximately match the tire width, for easier placement of the belt on the tire during installation. If the belt matches the tire width, it is easy to align the belt on the tire so it will run straight with the tire as the tire rotates, although that alignment may be possible with any width of belt. For example, for super-single tires, the belt width may be the same as for a conventional single tire, or the belt may be an 18-inch-wide belt in order to match the 18 inch width of a super single tire. One may note from FIGS. 18-20 that the belt may be substantially less wide than the chain and the total tread surface.

Various extension materials and extension member surfaces may be found to be effective. Many of the preferred extension materials and surfaces will be within the general guidelines for flexibility vs. rigidity, and for weight, that have been discussed above.

Figure 14:
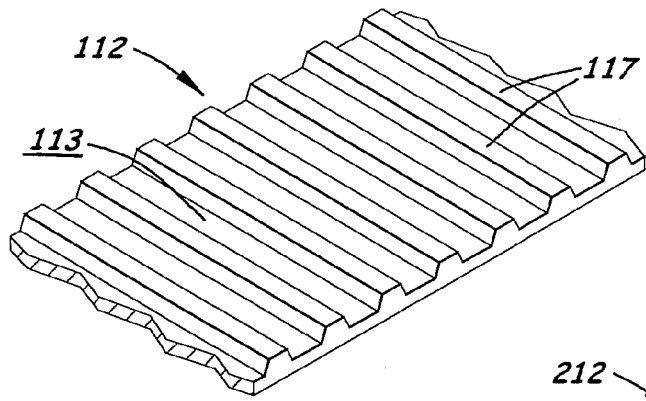
FIG. 14 is a partial view of an alternative extension that may be used in tools according to the invention, wherein said extension is a belt/strap having transverse ribs.

The preferred extension is a continuous belt of material with a flat surface 13, such as is portrayed in FIGS. 1-7. The flat surface 13 provides a continuous and broad surface for sufficient contact surface area and friction between the belt and the tire. FIG. 14 illustrates an alternative belt 112 having a continuous and broad surface 113 with one embodiment of ribs 117 that may increase friction and gripping between the belt 112 and the tire tread. By "continuous" is meant not having any significant holes, apertures, openings, as opposed to meaning an endless belt that extends continuously in a circle without ends.

Figure 15:
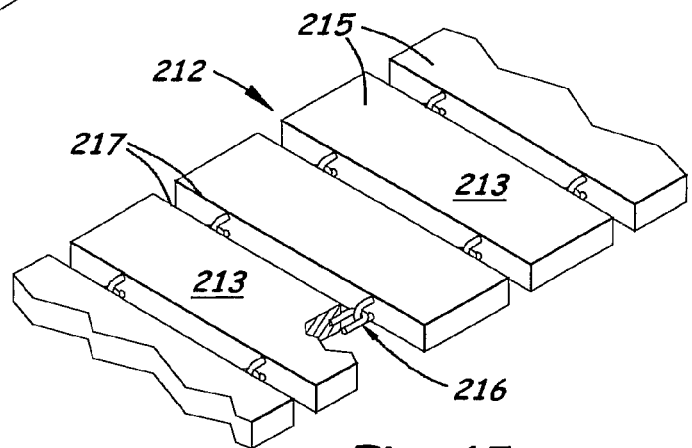
FIG. 15 is a partial view of an alternative extension that may be used in tools according to the invention, wherein said extension comprises multiple transverse strips or thin blocks connected to each other by hooks, wires, or other fasteners that allow the transverse strips/blocks to pivot relative to each other so that the extension may curve around the circumference of a tire.

A non-continuous material or materials also may be effective for the extension. FIG. 15 illustrates one embodiment of a non-continuous extension 212 made of transverse strips 215 linked together by wire hooks 216 or other fasteners so that the strips 215 may pivot relative to each other. This pivoting allows the extension 212 to curve around the tire circumference as discussed above for the preferred methods. The outer surfaces 213 of the strips 215, and in some instances their edges 217, form the surface that contacts and grips the tire tread.

Figure 16:
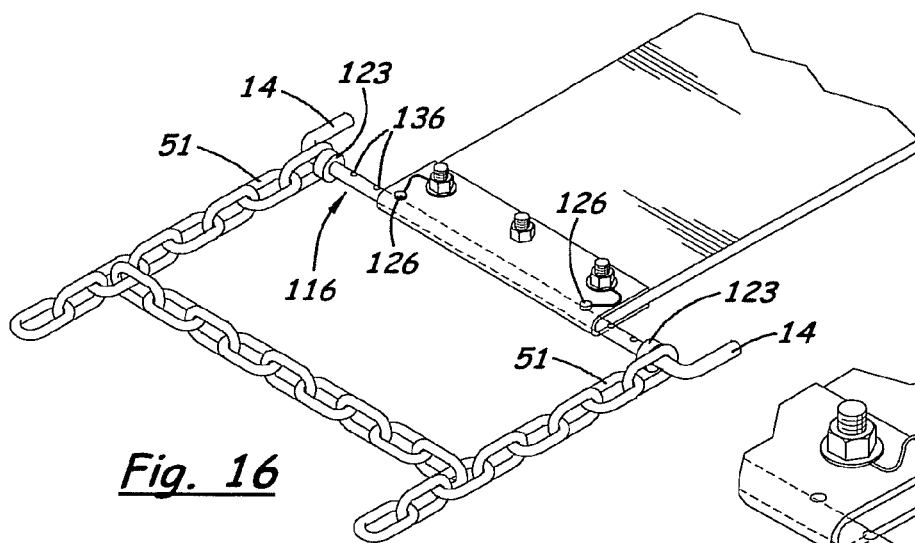
FIG. 16 is a partial view of one embodiment of extension with a connector that is extendable in a transverse direction (extendible/expandable in width) and that has stops on each hook of the connector to retain the traction chain in the illustrated spread-out configuration.
Figure 17:
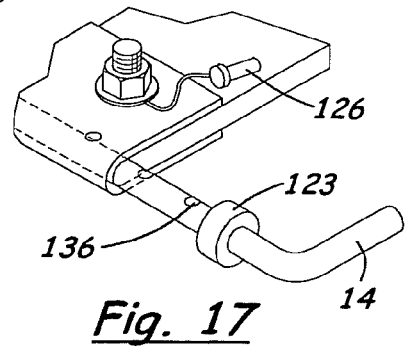
FIG. 17 is a detailed view of a portion of the embodiment shown in FIG. 16, detailing one embodiment of a fastening system that allows the connector to extend to, and be locked in, various widths.

In some cases, the leading end of the tire chain 50 will be maintained in spread-apart configuration by means of the outer runners 51 of the chain 50 being held on the two hooks 14 or other fasteners, wherein the belt 12 prevents the outer runners 51 from sliding together any closer than the width of the belt 12. See FIGS. 3, 5 and 6, for example. Alternatively, as illustrated by the embodiments in FIGS. 7, 16, and 17, stops or other limiting structure may be provided to prevent collapse of the traction device leading end to a non-spread-apart configuration. In FIG. 7, aims 23 of the hook assembly 22 cooperate with the hooked ends 114 to retain the outer runners 51 between said hooks and arms. In FIGS. 16 and 17, stops 123 are provided beside each hook 14 to retain the outer runners 51 in between said hooks and stops. In addition, the bracket 116 of FIGS. 16 and 17 is extendable in width (transverse to the length of the belt) to move the hook-stop combinations in and out relative to the belt, to accommodate different widths of chains 50 and spread apart the leading ends of said different widths of chains. Various means for extending the hooks or other fasteners may be used, for example, including telescoping or slidable bracket portions and including removable pin 126 and hole 136 lock systems that lock the slidable, expandable bracket portions in place at selected positions. It is noteworthy that, if the leading end of the traction chain or other traction device is spread-apart to its maximum width during installation, the middle and trailing end of the traction chain/device will tend to stay properly spread-apart around the tire circumference, that is, with one runner on the near side of the tire and the opposing runner on the far side of the tire.

The preferred embodiments are convenient and safe to use, at least in part because they do not require attachment of the tool to the tire or wheel except by the act of laying the extension/belt around a portion of the tire. The preferred embodiments do not require any hooking, engaging, or clamping the tire (except in as much as the extension/belt curves around the circumference of the tire and may be "tucked" or "wedged" between the tire and the ground) and do not require any hooking, engaging, or clamping of the sides of the tire by the tool. The preferred embodiments do not require the tire to be driven up on a raised platform to begin the installation process.

An especially-preferred embodiment is illustrated in FIGS. 18-20, wherein chain installation device 200 has a connector 214 that receives/connects to multiple types and sizes of traction devices. For example, the device 200 which has a single narrow belt 212, may be used for all of a conventional single tire (FIG. 18), a super-wide-single tire (FIG. 19), or a set of dual tires (by connecting to a triple-runner chain, for example, FIG. 20). The belt 212 may be riveted or otherwise fastened to the connector 214, which connector 214 extends farther out to one side of the belt 212 than the other. Notches 215 are provided along the connector 214 at various locations to correspond to the various runner locations of the desired chains when the leading ends of the chains are fully-extended to their maximum width. Thus, the notches serve as a type of stop that control the locations of the runners and maintain them in spread-apart condition.

The device 200 may be installed on a tire or tires, as described earlier in this document, with the benefit of using a single belt 212 even with the super-wide and/or dual tires. The belt 212 may be installed on the single tire (FIG. 8) or a super-single tire (FIG. 19) with the end 216 of the connector 214 protruding past (inward or outward as convenient for a given vehicle) the single tire. On a super-single tire (FIG. 19), the belt, being narrow relative to the single tire, will lie along approximately the outer half of the tire tread rather than being centered on the tire. On dual tires (FIG. 20), the belt 212 will lie on the outer of the two tires, with no belt being necessary on the inner of the two tires. The relatively narrow belt 212 is expected to grip, and stay properly aligned, on the single tire, the outer half of the tread of the super-single, or the outer tire of the set of duals, even though (especially with super-single and duals) the belt 212 only covers a portion of the total tread of the tire/tires. Tucking the distal end of the belt under the tire, as described earlier, may help keep the belt aligned in spite of the best being offset from the center line of the chain (FIGS. 19 and 20).

The embodiment shown in FIGS. 18-20 illustrates a connector at least twice as wide as the belt 212, and preferably approximately three times as wide. Various other styles, shapes, and constructions of the connector, notches (and/or other stop may be used for the extra-wide connector illustrated generally by FIGS. 18-20. For Example, the installation device 200 could use pins, hooks, latches, or other retainers or chain spacers instead of the notches 215, in order to connect and retain the spacing of runners of the traction device on the bar.

Although this invention has been described above with reference to particular means, materials and embodiments, it is to be understood that the invention is not limited to these disclosed particulars, but extends instead to all equivalents within the scope of the following claims.

I claim:

1. An installation system for installing a traction device upon a vehicle tire, the system comprising:
   a traction device for being wrapped around a tire to increase traction between the tire and a road or the ground, the traction device having a longitudinal axis;
   an elongated tool comprising an extension detachably connected at one end to the traction device and extending out from the traction device, wherein the extension is flexible and has a length 50-120 percent of the length of the traction device so that said extension is adapted to wrap around at least 50 percent of the tire circumference onto which the traction device is being installed.

2. An installation system as in claim 1, wherein said extension is a strap of material having a continuous flat surface that is without apertures, protrusions, chain links, studs, and spikes adapted to lay around said circumference.

3. An installation system as in claim 1, wherein said one end comprises an elongated hook secured to said extension and having two curved or bent ends for hooking onto a chain-type traction device.

4. An installation system for installing a traction device upon a vehicle tire, the system comprising:
- a traction device for being wrapped around a tire to increase traction between the tire and a road or the ground, the traction device having a longitudinal axis;
- an elongated tool comprising an extension detachably connected at one end to the traction device and extending out from the traction device, wherein the extension is flexible and has a length 50-120 percent of the length of the traction device so that said extension is adapted to wrap around at least 50 percent of the tire circumference onto which the traction device is being installed;
- wherein said one end comprises an elongated bar secured to said extension and having multiple notches in the bar at spaced intervals for receiving various sizes and types of tire chains.

5. An installation system as in claim 4, wherein said bar extends farther out from one side of the extension than said bar extends out from the other side of the extension.

6. An installation system as in claim 4, wherein said bar is adapted to connect to all of a single tire chain, a super wide single tire chain, and a triple-runner tire chain.

7. An installation system as in claim 1, wherein said traction device is a traction chain having two runners, and said extension is connected at one end to the traction chain by means of two hooks extending out from the extension and hooking onto said runners.

8. An installation system as in claim 1, wherein said extension is 60-120 inches long.

9. An installation system as in claim 1, further comprising a second of said elongated tools, and said traction device is a triple runner chain, the system further comprising an adapter to connect said tool and said second tool into a combined tool unit so that said tool and said second tool are side-by-side and parallel, and the combined tool unit is connected to all three of the runners of the triple runner chain.

10. An installation system as in claim 1, wherein said traction device is a tire chain.

11. An installation system as in claim 1, wherein the extension is connected at one end to the traction device by a connector having two hooks which receive side portions of the traction device.

12. An installation system as in claim 1, wherein the extension is connected at one end to the traction device by a connector adapted to keep side portions of the traction device spread-apart to the maximum width of said traction device.

13. A method of installing a traction device on a vehicle tire, the method comprising:
- providing a device comprising an elongated extension having a connector at a trailing end;
- attaching the extension to a traction device by means of the connector;
- laying the traction device on the ground behind a tire on a vehicle and wrapping the elongated extension around at least ½ of the circumference of the tire;
- driving the vehicle forward so that the tire rotates with the extension wrapped around it to pull the traction device up onto and around the circumference of the tire as the tire continued to rotate;
- stopping the vehicle at a time when rotation of the tire has pulled the traction device substantially all the way around the tire, disconnecting the device from the traction device, and fastening the traction device to itself so that it will remain on the tire during driving of the vehicle.

14. A method of installing a traction device on a vehicle tire, the method comprising:
- providing a device comprising an elongated extension having a connector at a trailing end;
- attaching the extension to a traction device by means of the connector;
- laying the traction device on the ground in front of a tire on a vehicle and wrapping the elongated extension around at least ½ of the circumference of the tire;
- driving the vehicle rearward so that the tire rotates with the extension wrapped around it to pull the traction device up onto and around the circumference of the tire as the tire continued to rotate;
- stopping the vehicle at a time when rotation of the tire has pulled the traction device substantially all the way around the tire, disconnecting the device from the traction device, and fastening the traction device to itself so that it will remain on the tire during further movement of the vehicle.

15. A method as in claim 13, wherein said elongated extension is a unitary, flat belt that is without apertures, protrusions, chain links, studs, and spikes.

16. A method as in claim 13, wherein said elongated extension is a ribbed belt.

17. A method as in claim 13, wherein said elongated extension comprises a plurality of transverse strips pivotally connected to each other.

18. A method as in claim 13, wherein attaching the extension to a traction device by means of the connector further comprises spreading a leading end of the traction device to its maximum width.

19. A method as in claim 13, wherein said connector comprises a hook with two curves or bent ends for being attached to the traction device.

20. A method of installing a traction device on a vehicle tire, the method comprising:
- providing a device comprising an elongated extension having a connector at a trailing end;
- attaching the extension to a traction device by means of the connector;
- laying the traction device on the ground behind a tire on a vehicle and wrapping the elongated extension around at least ½ of the circumference of the tire;
- driving the vehicle forward so that the tire rotates with the extension wrapped around it to pull the traction device up onto and around the circumference of the tire as the tire continued to rotate;
- stopping the vehicle at a time when rotation of the tire has pulled the traction device substantially all the way around the tire, disconnecting the device from the traction device, and fastening the traction device to itself so that it will remain on the tire during driving of the vehicle;
- wherein said connector comprises an elongated bar having multiple notches at spaced intervals for receiving various sized and types of traction devices.

21. A method as in claim 14, wherein said elongated extension comprises a plurality of transverse strips pivotally connected to each other.

22. A method as in claim 14, wherein attaching the extension to a traction device by means of the connector further comprises spreading a leading end of said traction device to its maximum width.

23. A method of installing a traction device on a vehicle tire as in claim 13, wherein the step of wrapping the elongated extension around at least ½ of the circumference of the tire further comprises inserting a leading end of the extension between the ground and the tire.

24. A method of installing a traction device on a vehicle tire as in claim 14, wherein the step of wrapping the elongated extension around at least ½ of the circumference of the tire further comprises inserting a leading end of the extension between the ground and the tire.

* * * * *